Nov. 8, 1960

H. C. PLUMMER 2,959,157

GOVERNOR WITH COMPENSATION MODIFIER

Filed Aug. 21, 1957

INVENTOR
Harland C. Plummer
By Carlson, Pitzner, Hubbard & Wolfe
ATTORNEYS

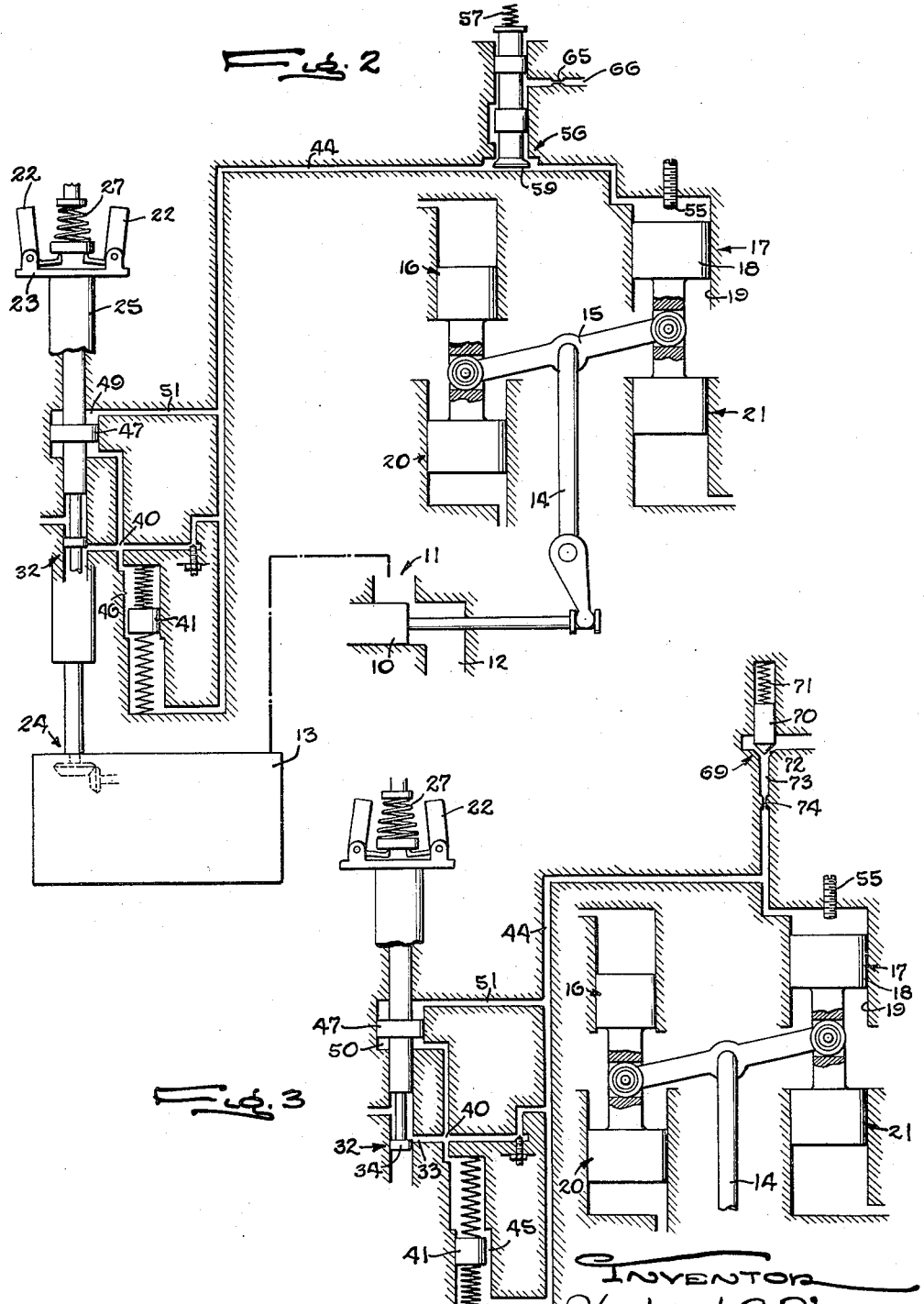

United States Patent Office 2,959,157
Patented Nov. 8, 1960

2,959,157
GOVERNOR WITH COMPENSATION MODIFIER

Harland C. Plummer, Rockford, Ill., assignor to Woodward Governor Company, Rockford, Ill., a corporation of Illinois Filed Aug. 21, 1957, Ser. No. 679,470
8 Claims. (Cl. 121—42)

This invention relates to governors for regulating the operation of prime movers and having a hydraulic so-called compensating system for achieving isochronous operation. More particularly, the invention relates to a governor of the type shown in Patent No. 2,669,973, in which the pressure in the compensating system is modified under certain conditions to avoid objectionable underspeeding of the prime mover.

A general object is to improve upon the patented governor by providing a compensation modifier which is more versatile and continuous in its action when brought into play, which operates independently of the position of the governor servo and which remains unaffected by variable operating conditions such as viscosity changes.

A more detailed object is to derive the modifying f rce from a separate pressure source and to apply the same through the action of a valve automatically re pon ive to pressure changes in a part of the governor compensating system.

A further object is to utilize pressure changes in certain parts of the compensating system as an indication of the need for initiating the modifying effect.

Other objects and advantages of the invention will become apparent from the following detai ed descript on taken in connection with the accompanying drawings, in which Figure 1 is a fragmentary sectional view and hydraulic circuit diagram of a speed governor embodying the novel features of the present invention.

Fig. 2 is a similar view with the parts positioned to minimize undershooting of the prime mover speed.

Fig. 3 shows a modification adapted to minimize overshooting of the engine speed.

Figure 1:
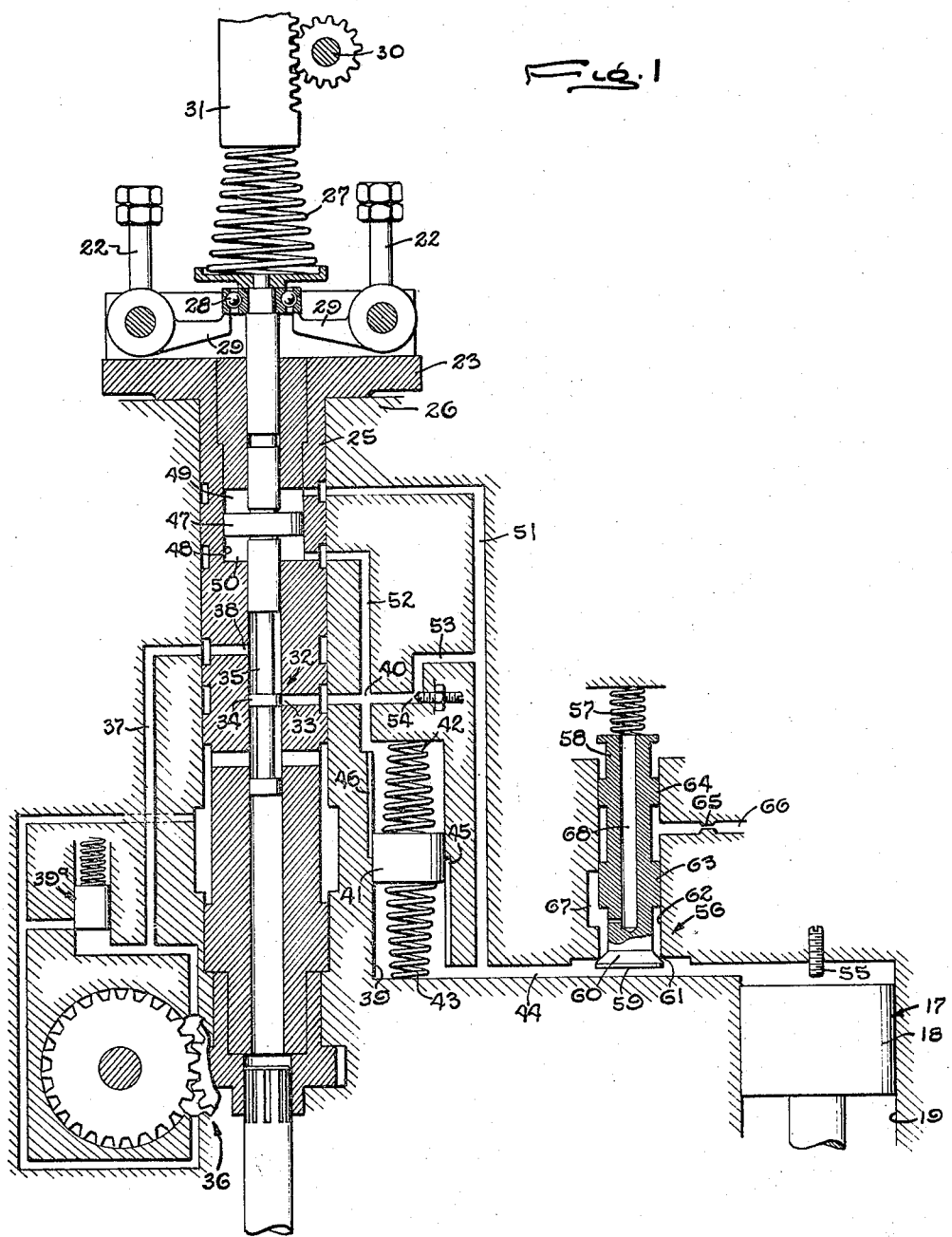

As illustrated in the drawings, the improved governor is especially adapted for actuating the movable member 10 of a valve 11 for regulating the flow of fuel from a pressure supply line 12 to a prime mover 13. Herein, the valve member is connected to a shaft 14 coupled by a lever 15 to a hydraulic servo 16 constantly energized to bias the valve member in the closing direction. The governor regulates the flow of pressure fluid to and from a servo 17 having a piston 18 slidable in a cylinder 19 and connected to the lever 15. The latter may be coupled to other hydraulic servos 20 and 21 adapted under abnormal engine operating conditions to be energized to temporarily override the primary servo 17, thereby disabling the governor.

Changes in the speed of the prime mover are detected by fly weights 22 upstanding from and pivoted on a head 23 and driven from the prime mover through suitable gearing 24. The ball head 23 is fast on the upper end of a ported sleeve 25, which is journa'ed in the governor casing 26. The centrifugal force acting on the flyballs is balanced against a compression spring 27 bearing downwardly against the inner race of a ball thrust bearing 28 whose outer race is engaged by arms 29 of the fly weights. The speed setting of the governor may be adjusted manually through the usual manually operable throttle suitably coupled to a shaft 30, which operates through a rack and pinion to adjust the position of the speeder spring abutment 31.

The control force derived from changes in the flyball speed is applied mechanically to a pilot valve 32 formed by a port 33 in the sleeve 25 coacting with a land 34 on a stem 35 slidable endwise in the sleeve 25 and connected at its upper end to the inner race of the bearing 28, which carries the lower abutment of the speeder spring. Fluid at a substantially constant superatmospheric pressure is supplied by a pump 36 having one gear coupled to the lower end of the rotating sleeve 25. Through a passage 37 and a port 38 in the sleeve, oil supplied by the pump is delivered into the sleeve above the land 34. This pressure is maintained approximately constant by a spring loaded valve 39$^a$ which, when the supply line pressure exceeds a predetermined value, by-passes fluid to a sump which may be formed by the interior of the governor casing.

Pressure fluctuations in a space 40 to which fluid is delivered or from which it is released when the valve is open are communicated to the servo cylinder 19 through a piston 41 slidable in a cylinder 39, communicating at one end with a space 40 and at the other end with a servo cylinder. Springs 42 and 43 under some initial compression act between the piston and opposite ends of the cylinder 39 to maintain the piston in a centered or neutral position when the pressures in the passages 40 and 44 are equalized.

In operation of the governor, a detected rise in speed causes the land 34 to be raised above the valve port 33, allowing fluid to escape to the sump from the space 40. Such pressure reduction allows the plunger 41 to move under the higher pressure existing in the servo cylinder 19, thereby compressing the spring 42 and al'owing the servo piston to be moved in the speed decreasing direction by the biasing servo. In a similar way, a decrease in the prime mover speed below the prevailing setting of the governor results in lowering the land 34 below its neutral position with the result that high pressure fluid from the line 37 is delivered to the passage 40, thus moving the plunger 41 to compress the spring 43 and correspondingly increase the pressure in the servo cylinder 19. Movement of the plunger 41 in opposite directions away from the neutral position is limited by by-passages 45 and 46 formed in the cylinder 39.

The so-called compensating effect for producing isochronous or constant speed operation of the prime mover is derived from the pressure differential which accompanies any speed change and is developed between the servo cylinder 19 and the valve controlled passage 40. This differential is applied to one of the valve elements, in this instance the valve stem 35, to produce a drooping characteristic, which is then dissipated gradually until, under the new load, the engine speed has been restored to normal, as determined by the governor speed setting. Herein, the differential pressure is applied to a piston 47 secured to the stem 35 above the main valve structure and slidable in a cylinder 48 formed within the rotating sleeve 25 and suitably closed at opposite ends so as to form a chamber 49 above the piston and a chamber 50 of similar size below the piston. To exert the pressure differentials above referred to on the piston 47 and in the proper direction, the upper chamber 49 is connected by a passage 51 which leads through the passage 44 to the servo cylinder. The valve outlet passage 40 is directly connected to the lower chamber 50 through a passage 52. As a result of these connections, the piston 47 and the valve stem will receive a resultant upwardly directed force following downward movement of the valve stem in response to the detection of a speed decrease. Conversely, when fluid is released from the passage 40 in response to a speed increase, the pressure in both chambers 49 and 50 changes, but that in the upper chamber predominates and this results in the application of a downward force on the receiving piston 47. In each case, the modifying force on the piston 47 urges the valve stem in a direction opposite to its movement which produced the pressure differential, the desired drooping characteristic being thereby obtained.

Gradual reduction of the drooping characteristic is effected by progressively dissipating the pressure differential through a connecting passage 53 between the passages 40 and 51, having therein a restriction 54 which may be adjusted to vary the rate of leakage between the servo cylinder 19 and the valve outlet passage 40. The restriction may, as shown, take the form of a needle valve.

Assuming that the prime mover is operating above the normal idling speed and that the compensating system is at equilibrium, the parts will be positioned as shown in Fig. 1. If the load on the prime mover is increased and the speed thereby decreased, the flyballs will move in, allowing the speeder spring 27 to move the control land 34 downwardly to uncover the port 33 and permit a flow of pressure fluid to the passage 40 and the cylinder 39 moving the piston 41 against the action of the spring 43. Fluid is thus forced out of the other end of the cylinder and into the servo cylinder 19 to correspondingly open the fuel valve 11. As an incident to this, the pressure in the lower chamber 48 is increased above that in the upper chamber 49 by an amount proportional to the movement of the piston 41, resulting in the application to the receiving piston 47 of an upwardly directed restoring force. The drooping characteristic thus produced is maintained by the action of the spring 43 on the piston 47 but starts to dissipate immediately by fluid leakage through the restricted bypass 54 between the chambers 48 and 49. As the pressure differential decreases, the speed at which a given valve opening is maintained is brought closer to the normal speed setting of the governor, until the normal speed has been restored fully when the pressure differential has been dissipated and the piston 47 returned to balanced position, the system then being in equilibrium.

If the load decreases resulting in a speed increase, the valve land is raised by the flyball and the energization of the servo is reduced as above described by upward movement of the piston 41 against the action of the spring 42. A pressure differential is thus created between the chambers 48 and 49 resulting in a force applied to the receiving piston 47 in a downward direction. As before, the droop thus produced is dissipated by the leakage through the needle valve, the normal speed of the prime mover being restored when equilibrium again obtains with the return of the buffer piston 41 to balanced position.

In the operation of certain prime movers, particularly gas turbines, conditions are likely to arise which are conducive to undershooting or overshooting of the engine speed relative to the intended speed, as determined by the setting of the governor. For example, if the throttle is moved suddenly to a minimum fuel position, the servo piston 18 will move quickly to the no-load position, that is, against a stop 55 at the head end of the cylinder 19. Owing to the inertia of the prime mover, the speed of the latter will follow at a slower rate; and, as a result of this lag and the consequent escape of fluid from the servo cylinder, the prime mover will not accelerate promptly when the governor setting is again increased. Similar action frequently prevents a gas turbine from being accelerated or decelerated as rapidly as may be desired after the governer has been disabled temporarily by the usual auxiliary controls imposed through one of the servos 20 or 21 to limit the maximum or minimum flow of fuel independently of the governor.

The present governor aims to sense the occurrence of such operating difficulties and to overcome the same automatically by forcing the admission of pressure fluid into the compensating system to produce on the piston 47 a force which modifies the effective speed setting of the governor in the proper direction and maintains the modifying force so long as the abnormal operating condition persists. For this purpose, advantage is taken of the fact that the occurrence of predetermined pressure conditions in the compensating system are indicative of the need for thus modifying the governor action. For example, the danger of undershooting of the engine speed is evidenced by an abnormal fall, down to 10 p.s.i. in this instance, in the pressure in the servo cylinder 19 and the passages 44 and 51 leading to the upper compensating chamber 49. This condition may be sensed by a simple valve 56 loaded by a spring 57 and having a plunger 58 with an area 59 of proper size exposed to the fluid in the passage 44. Herein, the area 59 is the end of a head 60 on the plunger beveled to coact with a seat 61 at the end of a cylinder 62 in which spaced lands 63 and 64 on the plunger slide.

Between these lands, the cylinder communicates through a flow limiting restriction 65 with a source 66 of hydraulic fluid maintained under a pressure considerably higher, for example, 150 p.s.i., than that attained in the servo cylinder during normal steady state operation of the engine. In a gas turbine control, the latter pressure is usually between 50 and 100 p.s.i. The land 63 overlaps the upper end of a slot 67 in the cylinder 62 when the valve is closed, thus preventing continuous leakage through a passage 68 leading through the plunger and to the interior of the governor casing which constitutes a fluid sump and is usually at a pressure of about 25 p.s.i.

Considering the operation of the valve 56, let it be assumed that the engine throttle has been moved suddenly to the minimum speed position, thus reducing the force of the speeder spring 27. The fly weights immediately move out, as shown in Fig. 2, thus connecting the space 40 to the low pressure area. This perimts the piston 41 to move under the pressure in the servo cylinder 19, which pressure is reduced rapidly as permitted by movement of the piston 41, which eventually uncovers the bypass slot 46.

Owing to the engine inertia, the engine speed remains above the governor setting as the engine continues to decelerate. As a result, the pressure decrease in the servo cylinder continues to fall even after the piston reaches the stop 55, the governor then being out of control of the servo pressure. When the servo pressure thus decreases below the setting of the valve 56, the spring 57 overcomes the fluid pressure on the area 59 permitting the valve to open. This allows fluid from the high pressure source 66 to flow into the servo cylinder and the passages 44 and 51. The rate of flow is limited by the restriction 65 and the magnitude of the pressure rise is limited to the value at which the piston 41 uncovers the by-pass ports 46, thus permitting the incoming fluid to escape directly through the passage 40 and the then open governor valve 32.

The increased pressure in the passage 51 is transmitted to the compensating chamber 49 and exerted on the piston 47 in a downward direction. The force thus added to the stress of the speeder spring 27 results in an increase in the speed setting of the governor. The latter is thus conditioned to respond more quickly following movement of the throttle to increase the engine speed. With a substantial pressure already built up in the servo cylinder, the governor, and therefore, the fuel valve 11, will respond immediately to the throttle movement.

It will be observed that the modifying force is derived from an external source of pressure and, therefore, continues to act so long as the abnormal operating conditions prevail. The modifying action thus takes place independently of the position of the servo piston 18 and, therefore, may come into play at any position of the servo piston and rate of fuel flow to the prime mover. Thus, when the minimum limit control through the servo 21 becomes effective to override the governor, the latter will be conditioned in the manner above described for immediate response to the next increase in the governor speed setting.

The automatic modifying mechanism, as above described, is equally useful in preventing overshooting of the engine speed in response to a decrease in the speed setting of the throttle after the governor has been disabled by the overriding action of a maximum fuel limit control. Operating conditions giving rise to the need for such a readjustment of the governor are evidenced by a rise in the pressure in the servo cylinder to a value substantially above that attained in normal operation. As before, such a condition may be detected by a spring loaded valve 69 (Fig. 3) which is normally closed but set to open at a pressure, for example, of 120 p.s.i., which is substantially above that attained during normal steady state operation.

The valve 69 comprises a plunger 70 urged by a compression spring 71 toward a seat 72 in a passage 73 leading to the low pressure space within the governor casing. The passage communicates with the servo cylinder through a restriction 74.

The spring normally overcomes the pressure on the exposed end of the plunger 70 and holds the valve closed. When the servo pressure increases above the valve setting, the valve opens automatically, releasing fluid from the servo cylinder at a rate determined by the size of the restriction 74. At the time when such a pressure increase occurs, the governor will be set for a speed somewhat higher than the prevailing engine speed so that the fly weights will be swung inwardly, as shown in Fig. 3, thus lowering the land 34 below the port 33. Fluid at the supply pressure determined by the regulating valve 39ª, 150 p.s.i. in this instance, is thus admitted continuously to the space 40 and, therefore, to the lower chamber 50 of the compensating system. The resulting increase in the upward pressure exerted on the piston 47 in opposition to the speeder spring 27 correspondingly decreases the speed setting of the governor, thus adapting the latter for more rapid response to a decrease in the speed setting of the engine throttle. The magnitude of the modifying force thus derived from the pressure supply system of the governor will be limited by the piston 41 uncovering the by-passage 45 as shown in Fig. 3.

As a result of such a decrease in the governor speed setting, the governor will be adapted to cause fuel decreasing movement of the servo piston more promptly in response to a decrease in the throttle setting. Such action of the governor is accompanied by lowering of the servo pressure and a consequent automatic closing of the valve 69.

I claim as my invention:

1. Prime mover regulating apparatus having, in combination, a hydraulic servo including a cylinder and a piston slidable therein and cooperating with one end thereof to define a closed fluid filled chamber, a fluid filled space, means providing a source of fluid under pressure, a speed governor having a selectively adjustable speed setter and a valve operable in response to rises and falls in speed above and below the prevailing governor setting to respectively release fluid from said space and admit fluid to the space from said source whereby to maintain the pressure in the space within a predetermined normal range, a second cylinder communicating at opposite ends with said space and said servo chamber, a piston in said second cylinder yieldably urged in opposite directions, compensating mechanism operable to apply the pressure differential between opposite ends of said second cylinder to a part of said valve in a direction opposite to the control force producing such differential, said mechanism comprising a third cylinder, a piston slidable therein and attached to a movable part of said valve, passages connecting opposite ends of said third cylinder to said space and chamber, and a restricted leakage connection between said passages, a second source of fluid under pressure, and a spring loaded second valve having an area exposed to the fluid in said chamber and adapted when open to admit fluid from said second source to said chamber while said first valve is releasing fluid from said space, the loading of said second valve being adjusted to permit opening of the valve when the pressure in said chamber falls to a predetermined value below said normal range.

2. Prime mover regulating apparatus having, in combination, a hydraulic servo including a cylinder and a piston slidable therein and cooperating with one end thereof to define a closed fluid filled chamber, a fluid filled space, a control valve having a movable member and responsive to changes in a control force to admit or release pressure fluid from said space to maintain superatmospheric pressure therein within a normal operating range, a second cylinder communicating at opposite ends with said space and said chamber, a piston in said second cylinder yieldably urged in opposite directions, compensating mechanism operable to apply the pressure differential between opposite ends of said second cylinder to said valve member in a direction opposite to the control force producing such differential including a restricted leakage connection between opposite ends of said second cylinder, a third cylinder connected at opposite ends to said space and servo chamber, a piston on said valve member slidable in said third cylinder, a spring loaded normally closed second valve responsive to pressure changes in said servo chamber and adapted to open when the pressure falls below a predetermined value lower than said normal range, and means operable when said second valve is open to deliver pressure fluid to said chamber and raise the pressure therein as permitted by the release of fluid from said space through said control valve.

3. In a governor, the combination of, a piston, means including a cylinder guiding said piston and cooperating with one end thereof to define a closed fluid filled chamber, a fluid filled space, a valve responsive to changes in a control force to admit or release pressure fluid from said space to maintain normal operating pressure therein above a predetermined value, a second cylinder communicating at opposite ends with said space and said chamber, a piston in said second cylinder, spring means yieldably urging said piston in opposite directions to normally maintain the same in a centered position, compensating mechanism operable to apply the pressure differential between opposite ends of said second cylinder to a part of said valve in a direction opposite to the control force producing such differential, said mechanism including a restricted leakage connection between opposite ends of said second cylinder, means providing a source of fluid under pressure, a second valve controlling the admission of fluid from said source to said chamber, and means responsive to pressure changes in said chamber for opening said second valve when the pressure falls below a predetermined value lower than said first value.

4. Prime mover regulating apparatus having, in combination, a hydraulic servo including a cylinder and a piston slidable therein and cooperating with one end thereof to define a closed fluid filled chamber, a fluid filled space, a control valve having a movable member and responsive to changes in a control force to admit or release pressure fluid from said space to maintain superatmospheric pressure therein, a second cylinder communicating at opposite ends with said space and said chamber, a piston in said second cylinder yieldably urged in opposite directions, compensating mechanism operable to apply the pressure differential between opposite ends of said second cylinder to said valve member in a direction opposite to the control force producing such differential including a restricted leakage connection between opposite ends of said second cylinder, a third cylinder connected at opposite ends to said space and servo chamber, a piston on said valve member slidable in said third cylinder, a spring loaded normally closed second valve responsive to pressure changes in said servo chamber and adapted to open when the pressure falls below a predetermined value, and means operable when said second valve is open to deliver pressure fluid to said chamber and raise the pressure therein.

5. Prime mover regulating apparatus having, in combination, a hydraulic servo including a cylinder and a piston slidable therein and cooperating with one end thereof to define a closed fluid filled chamber, a fluid filled space, a control valve responsive to changes in a control force to admit or release pressure fluid from said space to maintain superatmospheric pressure therein, a second cylinder communicating at opposite ends with said space and said chamber, a piston in said second cylinder yieldably urged in opposite directions, compensating mechanism operable to apply the pressure differential between opposite ends of said second cylinder to a part of said valve in a direction opposite to the control force producing such differential including a restricted leakage connection between opposite ends of said second cylinder, means providing a source of fluid under pressure, a spring loaded normally closed second valve responsive to pressure changes in said servo chamber and operable when the servo pressure falls below a predetermined normal value to open and admit fluid from said source whereby to increase the pressure in said chamber and increase said force.

6. Prime mover regulating apparatus having, in combination, a hydraulic servo including a cylinder and a piston slidable therein and cooperating with one end thereof to define a closed fluid filled chamber, a fluid filled space, a control valve responsive to changes in a control force to admit or release pressure fluid from said space to maintain superatmospheric pressure therein, a second cylinder communicating at opposite ends with said space and said chamber, a piston in said second cylinder yieldably urged in opposite directions, compensating mechanism operable to apply the pressure differential between opposite ends of said second cylinder to a part of said valve in a direction opposite to the control force producing such differential including a restricted leakage connection between opposite ends of said second cylinder and passages respectively communicating with said servo chamber and said space, a spring loaded normally closed second valve responsive to pressure changes in one of said passages and adapted to open when such pressure changes beyond a predetermined normal value, and connections operable upon opening of said second valve to admit pressure fluid into one of said passages and thereby modify the force applied to said control valve by said mechanism.

7. Prime mover regulating apparatus having, in combination, a hydraulic servo including a cylinder and a piston slidable therein and cooperating with one end thereof to define a closed fluid filled chamber, a source of fluid under pressure, a fluid filled space, a control valve having a movable member and responsive to changes in a control force to admit fluid from said source to said space or release fluid from the space to maintain superatmospheric pressure therein within a normal operating range, a second cylinder communicating at opposite ends with said space and said chamber, a piston in said second cylinder yieldably urged in opposite directions, compensating mechanism operable to apply the pressure differential between opposite ends of said second cylinder to said valve member in a direction opposite to the control force producing such differential including a restricted leakage connection between opposite ends of said second cylinder, a third cylinder connected at opposite ends to said space and servo chamber, a piston on said valve member slidable in said third cylinder, a spring loaded normally closed second valve responsive to pressure changes in said servo chamber and adapted to open when the pressure rises above a predetermined value higher than said normal range, and means operable when said second valve is open to release fluid from said chamber whereby the flow of fluid from said pressure through said control valve increases the force on said compensating piston.

8. Prime mover regulating apparatus, having, in combination, a hydraulic servo including a cylinder and a piston slidable therein and cooperating with one end thereof to define a closed fluid filled chamber, a fluid filled space, a control valve responsive to changes in a control force to admit or release pressure fluid from said space to maintain superatmospheric pressure therein, a second cylinder communicating at opposite ends with said space and said chamber, a piston in said second cylinder yieldably urged in opposite directions, compensating mechanism operable to apply the pressure differential between opposite ends of said second cylinder to a part of said valve in a direction opposite to the control force producing such differential including a restricted leakage connection between opposite ends of said second cylinder, a spring loaded second valve responsive to pressure changes in said servo chamber, said second valve being normally closed but opened when said pressure increases to a predetermined value above normal, and means operable upon opening of said second valve to release fluid from said chamber and thereby allow an increased flow of pressure fluid into said space through said control valve.

References Cited in the file of this patent
UNITED STATES PATENTS

| 2,560,758 | Burritt | July 17, 1951 |
| 2,623,503 | Parker | Dec. 30, 1952 |
| 2,669,973 | Parker | Feb. 23, 1954 |